(12) United States Patent
Walley

(10) Patent No.: US 6,770,863 B2
(45) Date of Patent: Aug. 3, 2004

(54) APPARATUS AND METHOD FOR THREE-DIMENSIONAL RELATIVE MOVEMENT SENSING

(75) Inventor: Thomas M. Walley, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 80 days.

(21) Appl. No.: 10/004,512

(22) Filed: Oct. 26, 2001

(65) Prior Publication Data

US 2003/0080282 A1 May 1, 2003

(51) Int. Cl.[7] .............................. G06M 7/00; G09G 5/08
(52) U.S. Cl. ...................... 250/221; 702/153; 345/166
(58) Field of Search ..................... 356/28, 614, 615, 356/622; 702/152, 153; 345/166, 863, 158, 161, 157, 162, 169; 382/102, 154, 278, 107; 348/42, 47, 48; 250/221, 206.1, 206.2, 203.4, 559.29, 559.3, 216, 208.1, 203.1, 203.2, 203.3, 203.6; 396/153

(56) References Cited

U.S. PATENT DOCUMENTS

| | | | |
|---|---|---|---|
| 5,150,169 A | * | 9/1992 | Van Wagoner |
| 5,175,616 A | * | 12/1992 | Milgram et al. ............... 348/47 |
| 5,578,813 A | | 11/1996 | Allen et al. |
| 5,644,139 A | | 7/1997 | Allen et al. |
| 5,786,804 A | | 7/1998 | Gordon |
| 5,856,844 A | * | 1/1999 | Batterman et al. ...... 348/207.99 |
| 5,864,360 A | * | 1/1999 | Okauchi et al. ............... 348/47 |
| 6,005,987 A | * | 12/1999 | Nakamura et al. ........... 382/294 |
| 6,057,540 A | | 5/2000 | Gordon et al. |
| 6,151,015 A | | 11/2000 | Badyal et al. |
| 6,175,647 B1 | * | 1/2001 | Schick et al. |
| 6,204,852 B1 | * | 3/2001 | Kumar et al. |
| 6,205,241 B1 | * | 3/2001 | Melen ......................... 382/154 |
| 6,323,858 B1 | * | 11/2001 | Gilbert et al. ............... 345/419 |
| 6,411,326 B1 | * | 6/2002 | Tabata ......................... 348/47 |
| 2003/0020807 A1 | * | 1/2003 | Khoshnevis et al. ........... 348/42 |
| 2003/0025788 A1 | * | 2/2003 | Beardsley ..................... 348/43 |
| 2003/0035047 A1 | * | 2/2003 | Katayama et al. ............. 348/47 |

FOREIGN PATENT DOCUMENTS

| | | |
|---|---|---|
| EP | 0896267 | 2/1999 |
| GB | 2099255 | 12/1982 |

* cited by examiner

Primary Examiner—David Porta
Assistant Examiner—David C Meyer

(57) ABSTRACT

An apparatus for sensing three-dimensional relative movement includes a movable motion sensor including a first and a second two-dimensional array of photo detectors. At least one lens directs far-field images onto the first and the second arrays of photo detectors. The sensor is configured to generate digital representations of the far-field images and to generate three-dimensional relative movement data based on the digital representations of the far-field images. The movement data is indicative of motion of the sensor in three dimensions.

19 Claims, 4 Drawing Sheets

APPARATUS AND METHOD FOR THREE-DIMENSIONAL RELATIVE MOVEMENT SENSING

REFERENCE TO RELATED PATENTS

This Application is related to the subject matter described in the following U.S. patents: U.S. Pat. No. 5,578,813, filed Mar. 2, 1995, issued Nov. 26, 1996, and entitled FREE-HAND IMAGE SCANNING DEVICE WHICH COMPENSATES FOR NON-LINEAR MOVEMENT; U.S. Pat. No. 5,644,139, filed Aug. 14, 1996, issued Jul. 1, 1997, and entitled NAVIGATION TECHNIQUE FOR DETECTING MOVEMENT OF NAVIGATION SENSORS RELATIVE TO AN OBJECT; and U.S. Pat. No. 5,786,804, filed Oct. 6, 1995, issued Jul. 28, 1998, and entitled METHOD AND SYSTEM FOR TRACKING ATTITUDE. These three patents describe techniques of tracking position movement. Those techniques are a component in a preferred embodiment described below. Accordingly, U.S. Pat. Nos. 5,578,813, 5,644,139, and 5,786,804 are hereby incorporated herein by reference.

This application is also related to the subject matter described in U.S. Pat. No. 6,057,540, filed Apr. 30, 1998, issued May 2, 2000, and entitled MOUSELESS OPTICAL AND POSITION TRANSLATION TYPE SCREEN POINTER CONTROL FOR A COMPUTER SYSTEM; U.S. Pat. No. 6,151,015, filed Apr. 27, 1998, issued Nov. 21, 2000, and entitled PEN LIKE COMPUTER POINTING DEVICE; and U.S. patent application Ser. No. 09/052,046, filed Mar. 30, 1998, entitled SEEING EYE MOUSE FOR A COMPUTER SYSTEM. These two related patents and patent application describe screen pointing devices, with embodiments that use techniques described in U.S. Pat. Nos. 5,578,813, 5,644,139, and 5,786,804. U.S. Pat. Nos. 6,057,540 and 6,151,015, and U.S. patent application Ser. No. 09/052,046, filed Mar. 30, 1998, entitled SEEING EYE MOUSE FOR A COMPUTER SYSTEM, are hereby incorporated herein by reference.

THE FIELD OF THE INVENTION

This invention relates generally to optical sensor devices. This invention relates more particularly to an optical sensor device for sensing relative movement in three dimensions.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mouse, optical pointing devices have also been developed, such as those described in the incorporated patents and patent application. In one form of an optical pointing device, rather than using a moving mechanical element like a ball in a conventional mouse, absolute movement between an imaging surface, such as a finger or a desktop, and photo detectors within the optical pointing device, is optically sensed and converted into movement information.

The photo detectors in optical pointing devices are typically implemented in a flat, two-dimensional array. The array of photo detectors is capable of measuring absolute two-dimensional movement. As the array moves across an image, or the image moves across a stationary array, motion can be detected by comparing successive images. The sensed motion is in terms of the number of pixels that the image on the pixel array has moved. The array is at a fixed distance and a fixed angle from the surface being imaged, so the motion that is sensed is absolute (within the error tolerance of the system). The surface or scene that is imaged by an optical pointing device is a near-field image, meaning that the surface is very close to the sensor array.

If optics are used that allow the sensor array to focus on far-field objects, then the distance to the objects is not known and the sensed movement is relative. It would be desirable to provide a three-dimensional relative movement sensing apparatus using multiple conventional two-dimensional photo detector arrays and appropriate optics for focusing far-field objects.

SUMMARY OF THE INVENTION

One form of the present invention provides an apparatus for sensing three-dimensional relative movement. The apparatus includes a movable motion sensor including a first and a second two-dimensional array of photo detectors. At least one lens directs far-field images onto the first and the second arrays of photo detectors. The sensor is configured to generate digital representations of the far-field images and to generate three-dimensional relative movement data based on the digital representations of the far-field images. The movement data is indicative of motion of the sensor in three dimensions.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
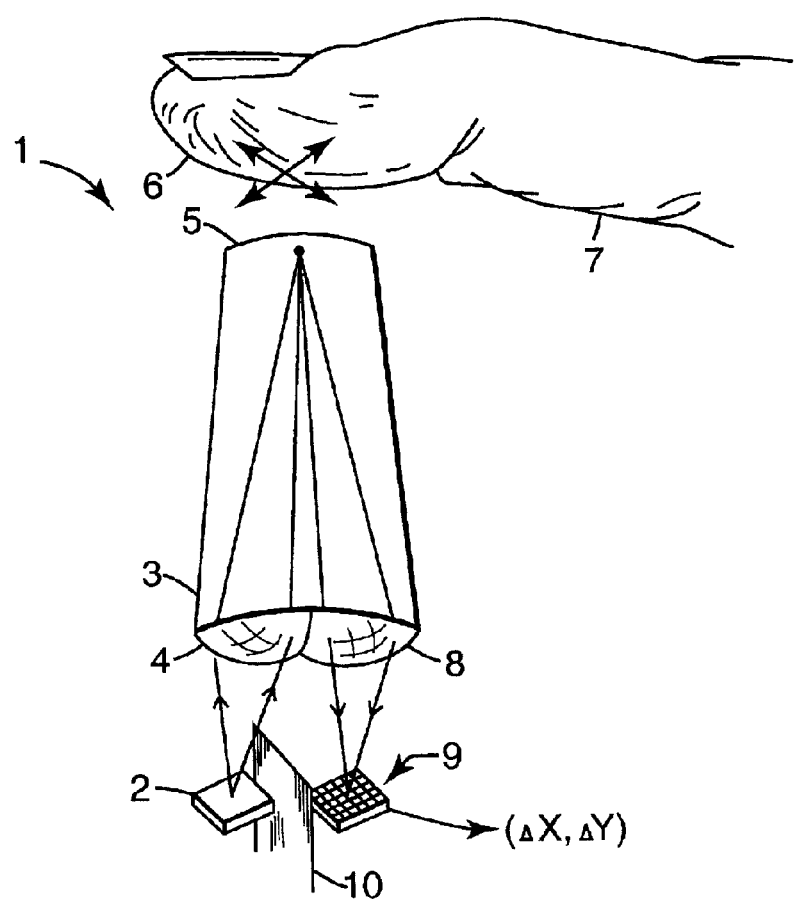
FIG. 1 is a pictographic side view illustrating the main components of a prior art, optical, motion translation type screen pointer device.

FIG. 1 shows a simplified representation of a side view of a prior art motion detection device 1 suitable for tracking the movement of a human finger 7 pressed against a surface 5 of a transparent stud 3. A motion detection device like that shown in FIG. 1 is described in detail in the above-incorporated U.S. Pat. No. 6,057,540 (the '540 patent). The operation of motion detection device 1 is also summarized below.

LED 2 emits light that is projected by lens 4 onto a region 5 that is part of a work surface 6 to be imaged for navigation. When the tip 6 of finger 7 is pressed against surface 5, the ridges of skin and any other micro texture features are visible in the plane of surface 5, just as if they were a part of surface 5. Lens 8 focuses light from those features onto an array of photo detectors, which is part of movement sensor 9. In one embodiment, motion sensor 9 is an integrated circuit (IC) having an array of photo detectors, memory, and arithmetic circuits arranged to implement image correlation and tracking functions. An image of the illuminated region 6 is projected through an optical window (which may be transparent stud 3 itself) to a package (not shown) of integrated circuit 9 and onto the array of photo detectors. Lens 8 aids in the projection of the image onto the photo detectors. Movement sensor 9 automatically acquires and tracks any suitable image. When tracking an image, movement sensor 9 produces incremental (X, Y) signals.

Figure 2:
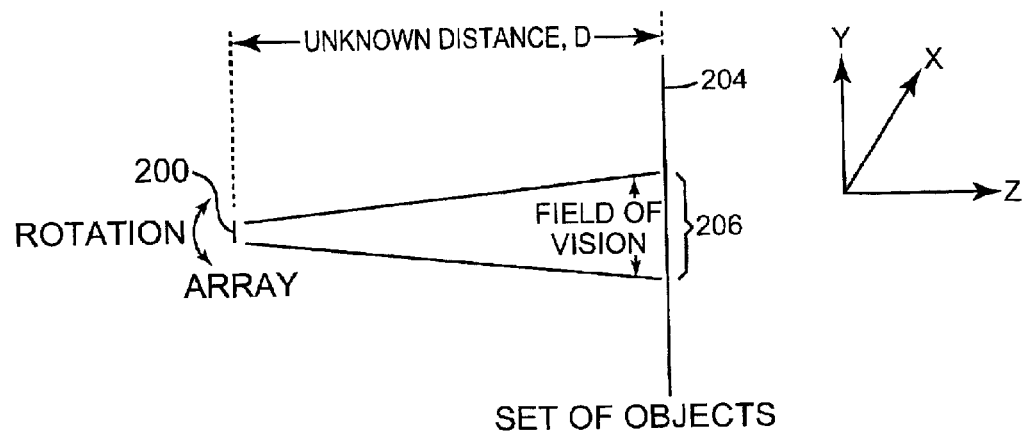
FIG. 2 is a diagram illustrating a single two-dimensional photo detector array configured to capture images of far-field objects.

FIG. 2 is a diagram illustrating a single two-dimensional photo detector array 200 configured to capture images of far-field objects. Photo detector array 200 is perpendicular to the paper in FIG. 2. Photo detector array 200 is pointed at a scene or set of objects 204, which is an unknown distance, D, from array 200. A lens (not shown) focuses the portion of scene 204 within the field of vision 206 of the lens onto the surface of photo detector array 200. Array 200 is a conventional photo detector array, such as that used in optical pointing devices, but generates images of far-field objects rather than near-field objects as in optical pointing devices.

A three-dimensional (X, Y, Z) coordinate system is also shown in FIG. 2. Photo detector array 200 is aligned with the plane formed by the X-axis (into the paper) and the Y-axis. If photo detector array 200 is rotated about the Y-axis (i.e., looking at scene 204, array 200 is rotated left or right), the image on the surface of photo detector array 200 moves as array 200 is rotated. And the motion can be detected by correlating successive images. The absolute amount of angular motion will be unknown for several reasons, including: (1) The distance, D, from the array 200 to the scene 204 is unknown; (2) the distance from the array 200 to the scene 204 changes as the angle of the array 200 with respect to the scene 204 changes; and (3) the sizes of the features in the scene 204 are unknown.

Despite these unknown values, the relative angular motion of the array 200 with respect to the scene 204 being viewed can be detected. If array 200 is rotated about the X-axis (i.e., looking at scene 204, array 200 is rotated up or down), then relative angular motion in a second dimension can be detected. Array 200 can also sense relative linear motion in two dimensions.

Figure 3:
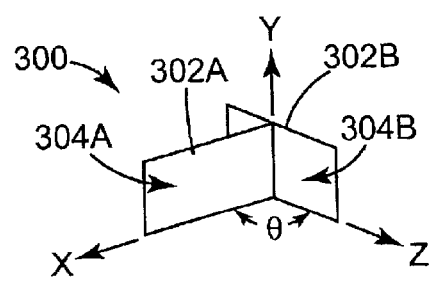
FIG. 3 is a diagram illustrating a photo detector array arrangement according to one embodiment of the present invention.

FIG. 3 is a diagram illustrating a photo detector array arrangement 300 according to one embodiment of the present invention. Photo detector array arrangement 300 includes photo detector arrays 302A and 302B (collectively referred to as photo detector arrays 302), which are constructed at an angle, θ, with respect to each other. In one form of the invention, θ equals 90 degrees, although other configurations may be used. Photo detector array 302A includes an active surface 304A having a plurality of photo detectors, and photo detector array 302B includes an active surface 304B having a plurality of photo detectors. Active surfaces 304A and 304B are collectively referred to as active surfaces 304.

In one embodiment, photo detector array arrangement 300 is rotatable in three dimensions, and/or is linearly movable in three dimensions. Using appropriate lenses 406A and 406B (shown in FIG. 4) to focus far-field objects 204 onto the active surfaces 304A and 304B of photo detector arrays 302A and 302B, relative angular motion in three dimensions (i.e., rotation of photo detector arrangement 300 about each of the three axes—X, Y, and Z) can be determined by correlating successively captured images. Arrangement 300 can also detect three-dimensional relative linear motion. The detection of such relative angular and linear motion is described in further detail below.

Figure 4:
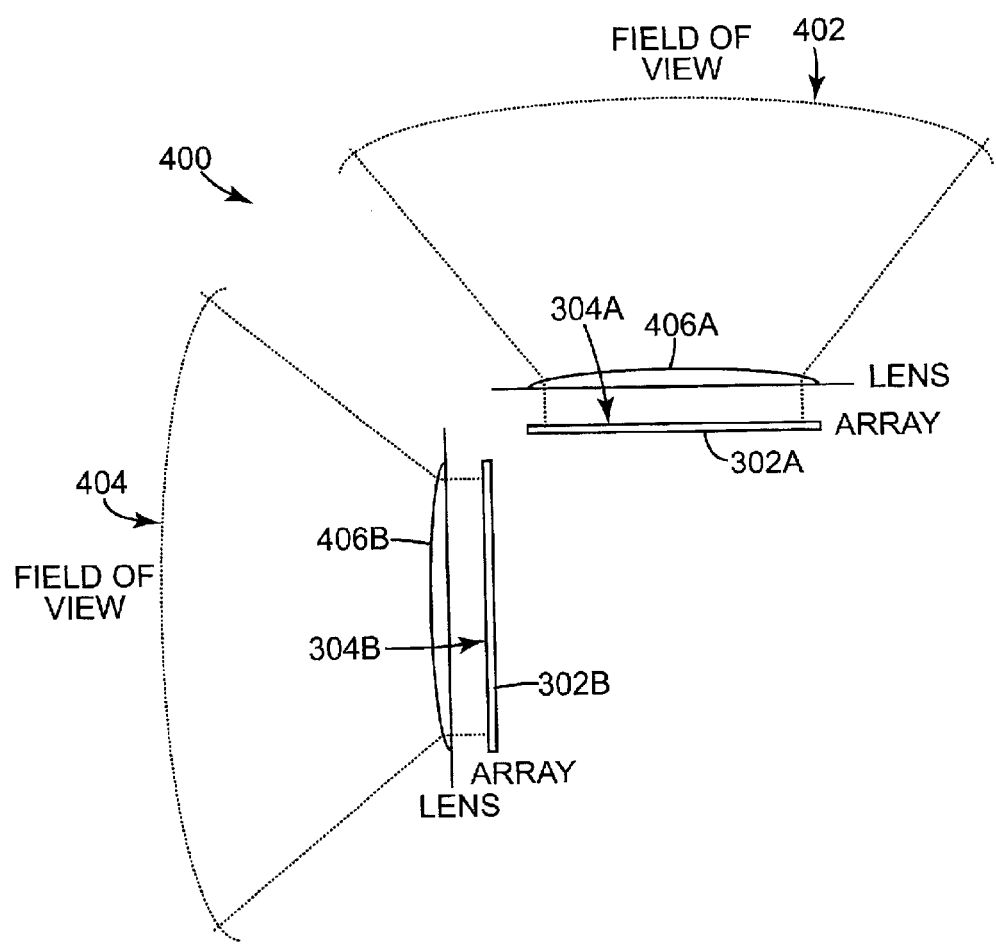
FIG. 4 is a diagram illustrating a photo detector array arrangement according to a second embodiment of the present invention.

FIG. 4 is a diagram illustrating a photo detector array arrangement 400 according to a second embodiment of the present invention. Photo detector array arrangement 400 includes photo detector arrays 302A and 302B (collectively referred to as photo detector arrays 302), which are constructed substantially perpendicular to each other, and includes lenses 406A and 406B (collectively referred to as lenses 406). Photo detector array arrangement 400 is similar to arrangement 300, but the end of one array 302A is positioned near the end of the second array 302B in arrangement 400, whereas in arrangement 300, the end of one array 302A is positioned near the middle of the second array 302B, rather than near the end of the second array 302B.

Like arrangement 300, one embodiment of photo detector array arrangement 400 is rotatable in three dimensions, and/or is linearly movable in three dimensions. Using lenses 406 to focus far-field objects 204 onto the active surfaces 304A and 304B of photo detector arrays 302A and 302B, relative angular motion in three dimensions can be determined. Arrangement 400 can also detect three-dimensional relative linear motion.

In one form of the invention, lenses 406 are standard lenses for focusing far-field images, such as those used in many currently available inexpensive cameras. Such lenses typically have a depth of field of about 2 feet to infinity, so objects within this distance range, and within the field of view 402 or 404 of lenses 406 will be in focus. In an alternative embodiment, an auto-focus system is used to focus images onto arrays 302.

One preferred motion detection technique according to the present invention, using photo detector array arrangement 300 or 400, involves optically detecting motion by directly imaging as an array of pixels the various particular optical features projected onto arrays 302. Light reflected from a set of far-field objects 204 is focused by lenses 406 onto the active surfaces 304 of a suitable array of photo detectors 302. The responses of the individual photo detectors are digitized to a suitable resolution and stored as a frame into corresponding locations within an array of memory. The digitized images are correlated to determine movement information.

Figure 5:
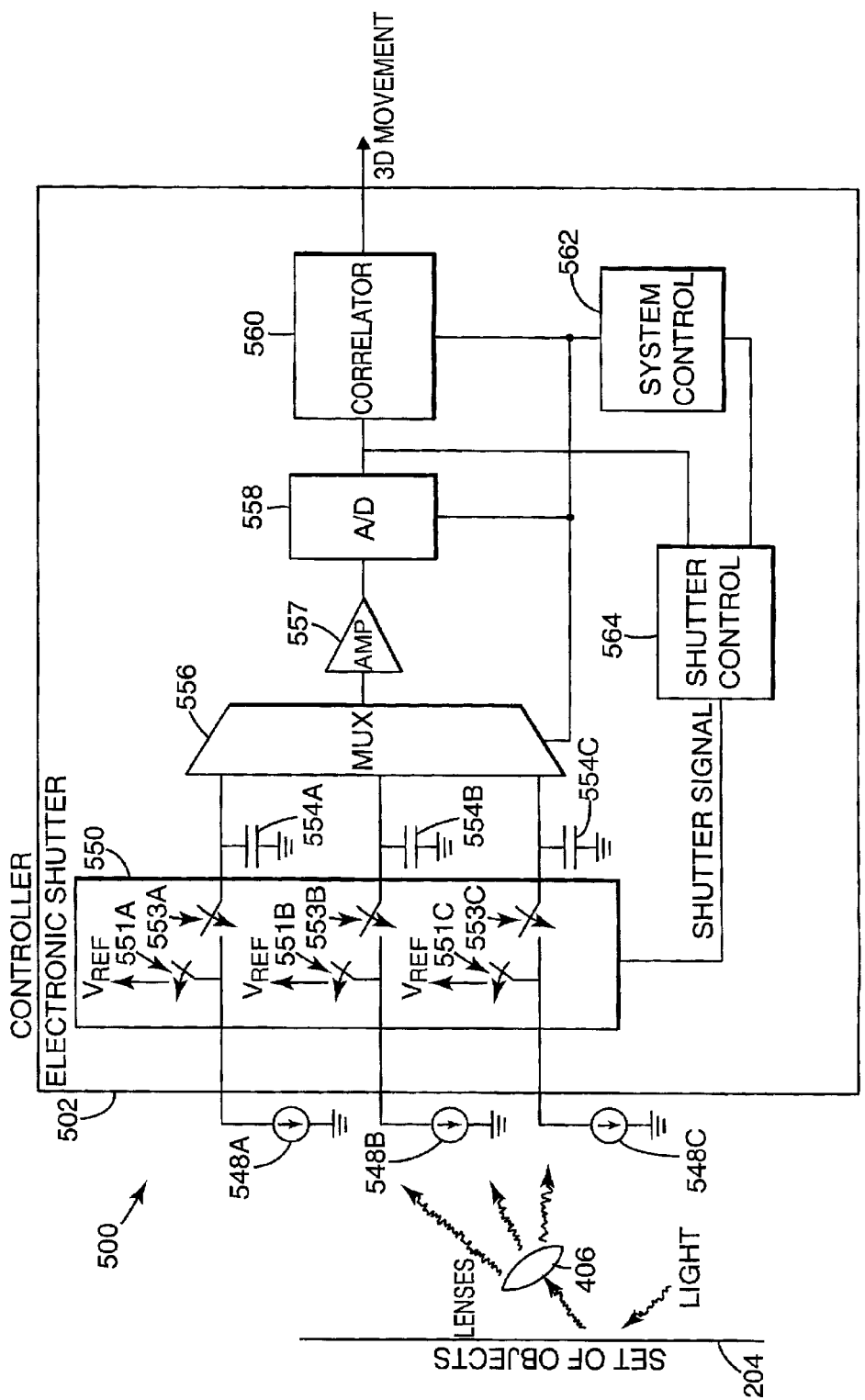
FIG. 5 is an electrical block diagram illustrating a sensor for sensing relative three-dimensional movement according to one embodiment of the present invention.

FIG. 5 shows an electrical block diagram illustrating major components of a three-dimensional relative motion sensor 500 according to one embodiment of the present invention. Motion sensor 500 includes lenses 406, light-sensitive photo-sensors 548A–548C (collectively referred to as as photosensors 548), and controller 502. Controller 502 includes electronic shutter 550 having a first plurality of switches 551A–551C (collectively referred to as switches 551) and a second plurality of switches 553A–553C (collectively referred to as switches 553). Controller 502 also includes a plurality of sense capacitors 554A–554C (collectively referred to as sense capacitors 554), multiplexer 556, amplifier 557, analog to digital (A/D) converter 558, correlator 560, system controller 562, and shutter controller 564.

The operation of controller 502 is primarily controlled by system controller 562, which is coupled to multiplexer 556, A/D converter 558, correlator 560, and shutter controller 564. In operation, according to one embodiment, light is directed onto a surface or set of far-field objects 204. Reflected light from surface 204 is directed by lenses 406 to light sensitive photo-sensors 548. Photo-sensors 548 represent photo detectors in arrays 302, and are also referred to as photo detectors 548. In one embodiment, photo detectors 548 each provide a current that varies in magnitude based upon the intensity of light incident on the photo detectors 548.

Shutter switches 551 and 553 are controlled by a shutter signal from shutter controller 564. Electronic shutter 550 is "open" when switches 551 are open and switches 553 are closed, and electronic shutter 550 is "closed" when switches 553 are open. Switches 551 are coupled to a reference voltage ($V_{REF}$). When shutter switches 551 are open and shutter switches 553 are closed (i.e., electronic shutter 550 is open), charge accumulates on sense capacitors 554, creating a voltage that is related to the intensity of light incident on photo detectors 548. When shutter switches 553 are opened (i.e., electronic shutter 550 is closed), no further charge accumulates or is lost from sense capacitors 554. Multiplexer 556 connects each sense capacitor 554 in turn to amplifier 557 and A/D converter 558, to amplify and convert the voltage from each sense capacitor 554 to a digital value. Sense capacitors 554 are then discharged by closing switches 551 and 553. After discharging sense capacitors 554, switches 551 are opened so that the charging process can be repeated.

Based on the level of voltage from sense capacitors 554, A/D converter 558 generates a digital value of a suitable resolution (e.g., one to eight bits) indicative of the level of voltage. The digital values represent digital images or digital representations of the optical images directed by lenses 406 onto arrays 302. The digital values may be processed, then stored as frames into corresponding locations within an array of memory within correlator 560. In one embodiment, each pixel in a frame corresponds to one of the photo detectors 548.

The overall number of photo detectors 548 for each array 302 is preferably large enough to receive an image having several features. In this way, images of such features produce translated patterns of pixel information as photo detector array arrangement 300 or 400 moves. The number of photo detectors 548 in each array 302 and the frame rate at which their contents are digitized and captured cooperate to influence how fast photo detector array arrangement 300 or 400 can be moved and still be tracked. Tracking is accomplished by correlator 560 by comparing newly captured sample frames with previously captured reference frames to ascertain movement information.

In one embodiment, the entire content of one of the frames is shifted by correlator 560 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by correlator 560 on a pixel by pixel basis, and the resulting differences are preferably squared and then summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames.

In one embodiment, two consecutive frames from one photo detector array 302A are correlated, two consecutive frames from a second photo detector array 302B are correlated, and then the results of these two correlations are correlated to determine relative three-dimensional movement information. By correlating images from each array 302 separately, and then correlating the results, photo detector array arrangement 300 or 400 can distinguish between rotation and translation. For example, if arrangement 300 or 400 is rotated left or right (e.g., rotated about the Y-axis in FIG. 3), the movement information obtained from array 302A will be similar to the movement information obtained from array 302B. In contrast, if arrangement 300 or 400 is linearly translated, along the X-axis in FIG. 3 for example, the images from array 302A will likely change substantially, whereas the images from array 304B may not change much. So for this linear translation, the movement information obtained from arrays 302A and 302B will likely be very different.

In addition to providing digital images to correlator 560, A/D converter 558 also outputs digital image data to shutter controller 564. Shutter controller 564 helps to ensure that successive images have a similar exposure, and helps to prevent the digital values from becoming saturated to one value. Controller 564 checks the values of digital image data and determines whether there are too many minimum values or too many maximum values. If there are too many minimum values, controller 564 increases the charge accumulation time of electronic shutter 550. If there are too many maximum values, controller 564 decreases the charge accumulation time of electronic shutter 550.

It will be understood by a person of ordinary skill in the art that functions performed by motion sensor 500 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Embodiments of the present invention may be used in virtually any application where detection of relative three-dimensional movement is desirable, including electronic gaming applications. For example, embodiments of the present invention may be used to control movement of an object (e.g., a screen pointer) displayed on a display screen for an electronic device. One embodiment of the present invention may be positioned on the top of an individual's head, so that when the individual's head turns to the left or right, tilts to the left or right, nods upward or downward, or makes other movements, corresponding three-dimensional relative movement data is generated and output by the sensor 500.

The use of multiple two-dimensional sensor arrays provides increased angular resolution over that obtainable by a single array, and requires less complex image processing algorithms. In addition to detection of relative three-dimensional movement, multiple two-dimensional sensor arrays can also be used to reduce errors in optical navigation systems. A large source of error in optical navigation systems is round-off error. Round-off errors tend to have a zero-mean, so the RMS value can be decreased by the use of multiple sensors arrays, such sensor array arrangements 300 or 400.

Although specific embodiments have been illustrated and described herein for purposes of description of the preferred embodiment, it will be appreciated by those of ordinary skill in the art that a wide variety of alternate and/or equivalent implementations maybe substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for sensing three-dimensional relative movement, the apparatus comprising:
    a movable motion sensor comprising a first and a second two-dimensional array of photo detectors; and
    at least one lens for directing far-field images onto the first and the second arrays of photo detectors, the sensor configured to generate digital representations of the far-field images and to generate three-dimensional relative movement data based on a correlation of the digital representations of the far-field images, the movement data indicative of motion of the sensor in three dimensions.

2. The apparatus of claim 1, wherein the three-dimensional relative movement data comprises three-dimensional relative angular rotation data indicative of rotation of the sensor in three dimensions.

3. The apparatus of claim 1, wherein the three-dimensional relative movement data comprises three-dimensional relative translation data indicative of linear motion of the sensor in three dimensions.

4. The apparatus of claim 1, wherein the three-dimensional relative movement data comprises three-dimensional relative angular rotation data indicative of rotation of the sensor in three dimensions, and three-dimensional relative translation data indicative of linear motion of the sensor in three dimensions.

5. The apparatus of claim 1, wherein the at least one lens comprises a first lens for directing far-field images onto the first array of photo detectors, and a second lens for directing far-field images onto the second array of photo detectors.

6. The apparatus of claim 1, wherein the first two-dimensional array of photo detectors is positioned substantially perpendicular to the second two-dimensional array of photo detectors.

7. The apparatus of claim 1, wherein the first two-dimensional array of photo detectors is positioned perpendicular to the second two-dimensional array of photo detectors.

8. A method of sensing relative three-dimensional movement comprising:
    providing a first and a second two-dimensional array of photo detectors;
    directing a first set of far-field images onto the first and the second arrays of photo detectors;
    digitizing outputs of the photo detectors in the first and the second arrays, thereby generating a first set of digital representations of the far-field images;
    allowing a first movement of the first and the second arrays of photo detectors;
    directing a second set of far-field images onto the first and the second arrays of photo detectors;
    digitizing outputs of the photo detectors in the first and the second arrays, thereby generating a second set of digital representations of the far-field images;
    correlating digital representations in the first set with digital representations in the second set; and
    generating a set of motion data based on the correlation indicative of relative motion in three dimensions of the first and the second arrays.

9. The method of claim 8, wherein the motion data comprises three-dimensional relative angular rotation data indicative of rotation of the first and the second arrays in three dimensions.

10. The method of claim 8, wherein the motion data comprises three-dimensional relative translation data indicative of linear motion of the first and the second arrays in three dimensions.

11. The method of claim 8, wherein the motion data comprises three-dimensional relative angular rotation data indicative of rotation of the first and the second arrays in three dimensions, and three-dimensional relative translation data indicative of linear motion of the first and the second arrays in three dimensions.

12. The method of claim 8, wherein the first two-dimensional array of photo detectors is constructed substantially perpendicular to the second two-dimensional array of photo detectors.

13. The method of claim 8, wherein the first two-dimensional array of photo detectors is constructed perpendicular to the second two-dimensional array of photo detectors.

14. The method of claim 8, and further comprising:
    outputting the motion data to an electronic device having a display screen; and
    moving an object displayed on the display screen based on the motion data.

15. An apparatus for sensing three-dimensional relative movement, the apparatus comprising:
    a first and a second two-dimensional array of photo detectors constructed in a substantially perpendicular arrangement;
    a first lens for directing far-field images onto the first array of photo detectors;
    a second lens for directing far-field images onto the second array of photo detectors; and
    a controller coupled to the first and the second arrays of photo detectors, the controller configured to generate digital representations of the far-field images and to generate movement data based on the digital representations of the far-field images, the movement data indicative of motion of the first and the second arrays in three dimensions.

16. The apparatus of claim 15, wherein the movement data comprises three-dimensional relative angular rotation data indicative of rotation of the first and the second arrays in three dimensions.

17. The apparatus of claim 15, wherein the movement data comprises three-dimensional relative translation data indicative of linear motion of the first and the second arrays in three dimensions.

18. The apparatus of claim 15, wherein the movement data comprises three-dimensional relative angular rotation data indicative of rotation of the first and the second arrays in three dimensions, and three-dimensional relative translation data indicative of linear motion of the first and the second arrays in three dimensions.

19. An apparatus for sensing three-dimensional relative movement, the apparatus comprising:

a movable motion sensor comprising a first and a second two-dimensional array of photo detectors, wherein the first two-dimensional array of photo detectors is positioned substantially perpendicular to the second two-dimensional array of photo detectors; and at least one lens for directing far-field images onto the first and the second arrays of photo detectors, the sensor configured to generate digital representations of the far-field images and to generate three-dimensional relative movement data based on the digital representations of the far-field images, the movement data indicative of motion of the sensor in three dimensions.

\* \* \* \* \*